Aug. 6, 1968   G. MONTELEONI ET AL   3,396,021

METHOD OF MAKING WIDE SCREEN MOTION PICTURES

Filed Dec. 26, 1963

INVENTORS
Giulio Monteleoni
Giovanni Ventimiglia
by Roberts, Cushman & Grover
ATT'YS

United States Patent Office 3,396,021
Patented Aug. 6, 1968

3,396,021
METHOD OF MAKING WIDE SCREEN MOTION PICTURES
Giulio Monteleoni and Giovanni Ventimiglia, Rome, Italy, assignors to Technicolor, Inc., a corporation of Delaware
Filed Dec. 26, 1963, Ser. No. 333,353
6 Claims. (Cl. 96—46)

ABSTRACT OF THE DISCLOSURE

An anamorphic wide screen motion picture print is made by exposing a negative in a camera without vertical or horizontal distortion but in a frame area of one-half normal height. Substantially all the negative picture area is filled by advancing the negative at half the normal feed rate. A positive print is then made by enlarging the vertical dimension of the picture in inverse proportion to the reduction of the negative feed rate without substantial change in width from that of the negative, so as to produce a print of normal frame dimensions with an anamorphosed wide scene filling the picture area of the print.

---

For many years the movie industry has been offering to the public an image on the screen of a larger horizontal dimension (often more than double) as compared to the vertical dimension.

To obtain such a result many systems were planned and utilized for shooting, printing and projecting. One of the more successful systems is the so-called anamorphic system which is obtained by photographing the scenes with a lens, or more precisely, with an optical system, having on the horizontal axis a reduction which is twice the reduction on the vertical axis, and projecting the image on the screen with an anamorphosing optical system so that the enlargement on the horizontal axis is twice as large as the enlargement on the vertical axis.

Variations of such a system have been the use at taking stage of a partial reduction on the horizontal axis, or avoiding the use of an anamorphic system while taking, but horizontally squeezing (i.e., anamorphically distorting) while printing the image.

The main defects of the above and similar methods are the use while shooting of optical anamorphic systems which cause reduction of the depth of field and distortion, loss of part of the frame while printing or projecting, non-economical use of the negative and/or positive area, and only partial exploitation of the projection aperture, resulting in a loss of light on the projection screen.

This invention obviates such inconveniences providing at the same time a format and a system for using substantially less raw (i.e., negative film) stock (though utilizing standard raw stock), and making possible conversion of such a format to a standard format on positive copies, so that the projection can be effected with normal equipment available in all theatres.

For the purpose of this discussion, two perforation 35 mm. frame is considered to be one-half the normal cinematographic film frame height, which is usually defined as a four perforation frame on the film. If the film advances at one-half the normal linear rate, it is clear that the maximum area of the negative available for exposure is cut one-half. The one-half standard film rate advance mechanisms are well-known in the prior art for instrumentation photography and the like. Although not adopted by the motion picture industry, two perforation frames have been proposed previously for motion pictures in order to save film. A comprehensive review of wide screen systems in terms of dimensions, areas, apertures, perforations, and pulldown was published in "American Cinematographer," May 1962, in an article beginning page 296 by Walter Beyer.

According to the invention a method for making wide screen motion pictures comprises the steps of: photographing a scene on film without anamorphic distortion and in a picture area of substantially less than the normal frame height, and printing said scenes with an enlargement substantially only in the vertical dimension such that a normal frame height is produced without substantial change from the width of said original scene frames.

More specifically the method comprises, exposing negative film strip of standard size and sprocket hole pitch (for example 35 mm. film) in a motion picture camera so as to form a plurality of undistorted images of substantially less than normal frame height (e.g., two perforations) while advancing the film strip at a fraction of the non-standard rate of feed (e.g., ½) so as to expose substantially all of the picture area of said film strip, developing said film strip, and printing from said negative film strip onto a standard positive film strip of the same size and pitch by anamorphic enlargement of the vertical component of the negative image without substantial change in the horizontal width of the negative image, thereby to produce a plurality of anamorphic images occupying substantially all of the picture area of the positive film strip, said vertical component being enlarged by a factor (e.g., 2) which is the reciprocal of said fractional frame rate.

For the purpose of illustration typical forms of the invention are shown in the accompanying drawing, in which.

Figure 1:
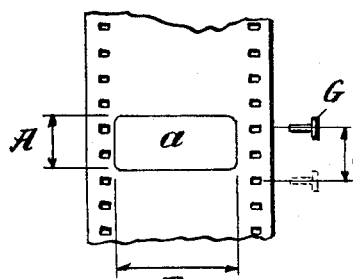
FIG. 1 is a plan view of 35 mm. motion picture negative film exposed according to the invention.

In the attached drawings, FIG. 1 represents a normal 35 mm. negative film on which is drawn a frame of about 9.4 mm. (A) and 22.05 mm. (B). Such frame covers a height of 2 perforations of the 35 mm. film according to the invention and is photographed with a 35 mm. camera equipped with normal lenses, i.e., non-anamorphic, in which the film advances at a rate corresponding to only two perforations per frame. As shown schematically, the claw G of the camera produces the movement S of the film for each frame, where S is equal to 9.490 mm.±0.50, the proper value depending on whether the negative film is short pitch or standard pitch. It is clear that with such a taking system it is possible to realize an economy of one-half the raw stock as compared with the movement of four perforations per frame, and still a greater economy if compared with other systems which have a film movement of more than 4 perforations.

Figure 2:
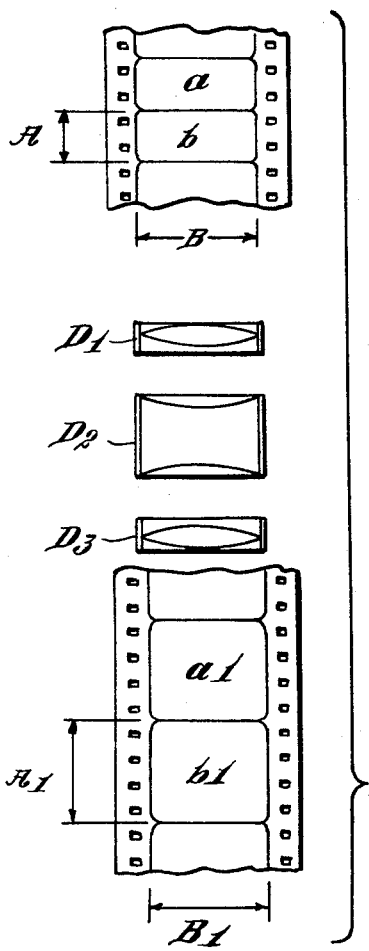
FIG. 2 is a schematic representation of printing from the negative film of FIG. 1 onto a positive film.

The printing of this negative frame is carried out with a suitable optical system similar to the one shown in FIG. 2 where the vertical enlargement of the frame is twice the horizontal one. In FIG. 2 the negative frame $a$ and $b$ of approximately 9.40 mm. (A) and 22.05 mm. (B) are projected by means of the optical system $D_1+D_2+D_3$ enlarged at a ratio of 1:2 vertically, producing frames $a_1$ and $b_1$ of about 18.80 mm. ($A_1$) and 22.05 mm. ($B_1$). The optical system $D_1$, $D_2$, $D_3$ consists essentially of a lens which focuses the image of the negative film on the field of the printing film. In this optical system has been inserted the element $D_2$ which, by means of cylindrical lenses or prisms, gives a vertical enlargement twice as large as the horizontal one. Many different optical systems well-known in the prior art can give the same result. Alternatively, said printing can also be carried out with a continuous optical printer, in which the linear speed of the printing film is twice that of the film to be printed with a consequent vertical stretching of the image of 1:2 as compared to the horizontal dimension. It is clear that a positive obtained with one of the above systems can be projected with a normal projector equipped with a 1:2 anamorphic lens exploiting the whole area of the film and the projector aperture.

The system illustrated is adaptable to numerous variations which fall within the invention.

It has also been ascertained that the use of a 16 mm. camera having a horizontal movement of the film of 2, 3 or 4 perforations per frame offers many advantages.

Figure 3:
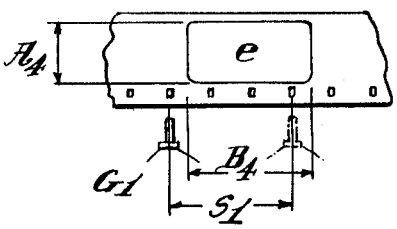
FIG. 3 is a plan view of 16 mm. negative film exposed according to the invention.

FIG. 3 shows a 16 mm. standard film perforated only at one edge (it is obvious that with a slight change in the frame size, i.e., by losing a small part of the image area, the invention also applies to 16 mm. film with perforations at both edges): the camera will have a horizontal movement of three perforations per frame. FIG. 3 also shows a camera transport claw $G_1$ which has a movement $S_1$ of 22.86 mm.±0.04.

Figure 4:
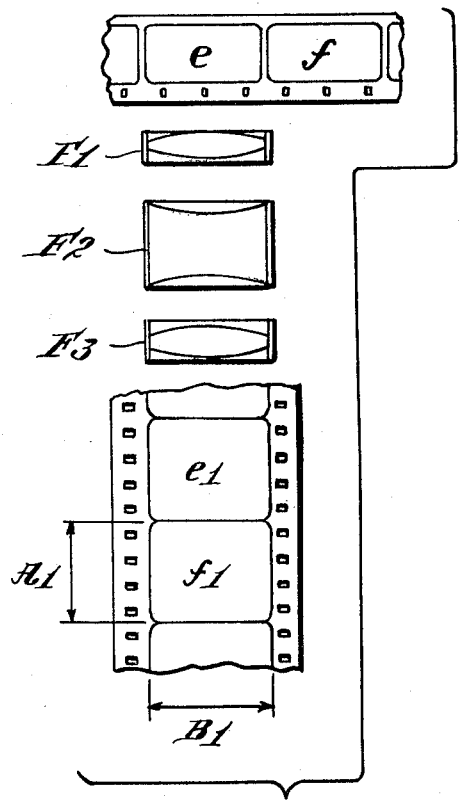
FIG. 4 schematically represents printing from the negative film of FIG. 3 onto a positive film.

The negative frame of FIG. 3 is printed as shown in FIG. 4. FIG. 4 represents printing of the 16 mm. film on a 35 mm. standard film which will move vertically, i.e., according to the standard of projection. The optical system has on the vertical axis an enlargement twice as large as the one on the horizontal axis, exploiting the format 21 x 9 mm. approx. of the orginal frame. The frame resulting on 35 mm. standard positive can be projected with normal anamorphic lenses, giving one of the accepted wide screen images of 2.35:1 aspect ratio. The dimension $A_1$ of FIG. 4 will be 18.7 mm. approx. while the dimension $B_1$ will be 22.05 mm.

It is evident that the invention is not confined to the above listed formats. When speaking of 35 mm. positive film, the normal perforation film is intended: the use of positive film with special perforations for magnetic sound makes it possible to obtain also slightly different formats and better or greater exploitation of the film area and projection aperture. Moreover, it must be borne in mind that printing copies may also mean the production of positive or negative duplicates or other intermediates necessary to the printing of copies to be sent to the theatres and to be presented to the public. Also in photographing it is possible to use reversal film or the like instead of ordinary negative film. Moreover, it is quite clear that the frames in question and the possible variations are adaptable to making 70 mm. copies exploiting printing systems similar to those illustrated above.

This invention can be used with black and white film, although the saving in cost is much more significant when color negative or reversal film is used. The percentage of saving is also higher when the invention is used for color TV productions, where only a small number of prints are required. In addition, the camera lenses can be relatively short focal length which results in a larger depth of field and focus.

The advantages of the present method over prior methods are many. The present method affords a substantial saving, as much as 50% in the cost of negative film processing. The cost of the negative film itself can be reduced even more than 50%, due to the elimination of approximately half the short film ends in the magazine in addition to the 50% reduction in film length per frame. An optimum amount of picture information can be recorded in the reduced size negative with the use of a spherical lens having great depth of field because a relatively shorter focal length lens can be used. With conventional methods of producing a squeezed image, a 50 mm. focal length lens is generally used on the camera, with a 35 mm. lens for maximum depth of field and wide angle shooting. The cameras in this invention normally use 25 mm. lenses, and can employ 18 mm. lenses for maximum angle and depth of field. No change is required in the camera film magazine, only a minor change in the film aperture and transport, the reduction in film transport movement actually resulting in quieter camera operation. Nevertheless the process as a whole does not result in loss of print quality as a result of the above mentioned saving. By using the same frame width in both the negative and print, and by enlarging substantially only in the vertical dimension, spherical and cylindrical lens distortion is minimized and information transfer is optimized. The horizontal component of picture information undergoes virtually no cylindrical distortion in printing, while the less noticeable vertical distortion is minimal.

This invention has been illustrated and described with reference to some recommended forms, but it is of course understood that variations can be made in practice without exceeding the scope of this invention.

We claim:

1. A method for making wide screen motion pictures comprising the steps of: photographing a scene on film without anamorphic distortion and in a picture area of substantially less than the normal frame height, and printing said scenes with an enlargement substantially only in the vertical dimension such that a picture area of normal frame height is produced without substantial change from the width of said original scene frames.

2. A method for making wide screen motion pictures comprising the steps of: photographing a scene on film without anamorphic distortion so as to form a plurality of frames of substantially less than the normal frame height in substantially all the picture area of the film, and printing said scenes with an enlargement substantially only in the vertical dimension such that a picture area of normal frame height is produced without substantial change from the width of said original scene frames.

3. The method of making a wide screen anamorphic motion picture comprising, exposing standard negative film strip in a motion picture camera so as to form a plurality of undistorted images of substantially less than normal frame height so as to expose substantially all of the picture area of said film strip, developing said film strip, and printing from said negative film strip onto a standard positive film strip by anamorphic enlargement of the vertical component of the negative image without substantial change in the horizontal width of the negative image, thereby to produce a plurality of anamorphic images occupying substantially all of the picture area of the positive film strip.

4. The method of making a wide screen anamorphic motion picture comprising, exposing standard negative film strip in a motion picture camera so as to form a plurality of undistorted images of substantially less than normal frame height while advancing the film strip at nonstandard rate of feed so as to expose substantially all of the picture area of said film strip, developing said film strip, and printing from said negative film strip onto a standard positive film strip by anamorphic enlargement of the vertical component of the negative image without substantial change in the horizontal width of the negative image, thereby to produce a plurality of anamorphic images occupying substantially all of the picture area of the positive film strip.

5. The method of making a wide screen anamorphic motion picture comprising, exposing standard negative film strip in a motion picture camera so as to form a plurality of undistorted images of substantially less than normal frame height while advancing the film strip at a fraction of the standard rate of feed so as to expose substantially all of the picture area of said film strip, developing said film strip, and printing from said negative film strip onto a standard positive film strip by anamorphic enlargement of the vertical component of the negative image without substantial change in the horizontal width of the negative image, while advancing the positive film strip at standard frame rate, thereby to produce a plurality of anamorphic images occupying substantially all of the picture area of the positive film strip, said vertical component being enlarged by a factor which is the reciprocal of said fractional frame rate.

6. The method of making a wide screen anamorphic motion picture comprising, exposing negative film strip of standard size and sprocket hole pitch in a motion picture camera so as to form a plurality of undistorted images of substantially less than normal frame height while advancing the film strip at a fraction of the standard rate of feed so as to expose substantially all of the picture area of said film strip, developing said film strip, and printing from said negative film strip onto a standard positive film strip of the same size and pitch by anamorphic enlargement of the vertical component of the negative image without substantial change in the horizontal width of the negative image, thereby to produce a plurality of anamorphic images occupying substantially all of the picture area of the positive film strip, said vertical component being enlarged by a factor which is the reciprocal of said fractional frame rate.

References Cited

UNITED STATES PATENTS

| | | | |
|---|---|---|---|
| 1,032,172 | 7/1912 | Zollinger | 352—44 |
| 3,046,832 | 7/1962 | Winzenburg | 96—46 X |

FOREIGN PATENTS

| | | |
|---|---|---|
| 1,103,759 | 3/1961 | Germany. |

NORMAN G. TORCHIN, *Primary Examiner.*

R. H. SMITH, *Assistant Examiner.*